United States Patent
Hsu et al.

(10) Patent No.: US 8,100,442 B2
(45) Date of Patent: Jan. 24, 2012

(54) ROTARY LOCK MECHANISM

(75) Inventors: Chih-Chiang Hsu, Taishan Township, Taipei County (TW); Tsung-Ju Chiang, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 877 days.

(21) Appl. No.: 12/216,104

(22) Filed: Jun. 30, 2008

(65) Prior Publication Data

US 2009/0235698 A1   Sep. 24, 2009

(30) Foreign Application Priority Data

Mar. 21, 2008   (TW) ................................ 97204902 U

(51) Int. Cl.
  *E05C 3/06*   (2006.01)
(52) U.S. Cl. .................... 292/194; 292/207; 361/379.55
(58) Field of Classification Search .................. 292/194, 292/198, 207; 361/671.55, 671.58; 429/97
  See application file for complete search history.

(56) References Cited

U.S. PATENT DOCUMENTS

| | | | | |
|---|---|---|---|---|
| 3,667,793 A * | 6/1972 | Varrin | ........................... | 292/216 |
| 4,061,371 A * | 12/1977 | Prather et al. | .................. | 292/198 |
| 5,676,408 A * | 10/1997 | Davidian | ...................... | 292/197 |
| 6,927,972 B1 * | 8/2005 | Wang et al. | ............... | 361/679.55 |
| 6,944,016 B2 * | 9/2005 | Chen et al. | ............... | 361/679.33 |
| 7,407,202 B2 * | 8/2008 | Ye et al. | ..................... | 292/251.5 |
| 7,455,334 B2 * | 11/2008 | Hisatomi et al. | ................ | 292/80 |
| 7,463,482 B2 * | 12/2008 | Chien et al. | ............... | 361/679.55 |
| 2009/0230701 A1* | 9/2009 | Chiang et al. | .................. | 292/140 |

* cited by examiner

*Primary Examiner* — Gary Estremsky
(74) *Attorney, Agent, or Firm* — Rabin & Berdo, P.C.

(57) ABSTRACT

A rotary lock mechanism disclosed includes a housing, a linear latch, and a rotary latch. The linear latch is disposed next to the housing and slides corresponding to the housing. The rotary latch is pivoted at a side of the housing, which faces the position structure. The rotary latch includes a dual-angle ramp disposed facing the linear latch. The linear latch may touch the dual-angle ramp to rotate the rotary latch when the linear latch slides corresponding to the housing.

17 Claims, 7 Drawing Sheets

ROTARY LOCK MECHANISM

RELATED APPLICATIONS

This application claims priority to Taiwan Application Serial Number 97204902, filed Mar. 21, 2008, which is herein incorporated by reference.

BACKGROUND

1. Field of Invention

The present invention relates to a lock mechanism. More particularly, the present invention relates to a rotary lock mechanism for locking a battery.

2. Description of Related Art

Notebooks are commonly used mobile devices and the global market for notebooks continues to grow. The space in the notebook is limited, thus the arrangement of the space in the notebook is an important consideration for designing the notebook. The battery is a necessary component of the notebook, and the battery takes up a lot space. The battery may be assembled and released in the notebook by a linear latch, but the arrangement of the linear latch would take a large space if the battery is assembled and released in the notebook only by the linear latch.

For the foregoing reasons, there is a need to reduce the battery lock space in the notebook.

SUMMARY

The invention provides a rotary lock mechanism, which includes a housing, a linear latch, and a rotary latch. The linear latch is disposed neighbor the housing and slides corresponding to the housing. The rotary latch is pivoted at a side of the housing, which faces the position structure. The rotary latch includes a dual-angle ramp disposed facing the linear latch. The linear latch may touch the dual-angle ramp to rotate the rotary latch when the linear latch slides corresponding to the housing.

The rotary lock mechanism may transform the linear movement of the linear latch into a rotational movement of the rotary latch. The linear latch may pass through the rotary latch smoothly by the first ramp of the rotary latch and the raked tip of the linear latch. The rotary latch may rotate corresponding to the linear latch when the linear latch touches the second ramp of the rotary latch.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
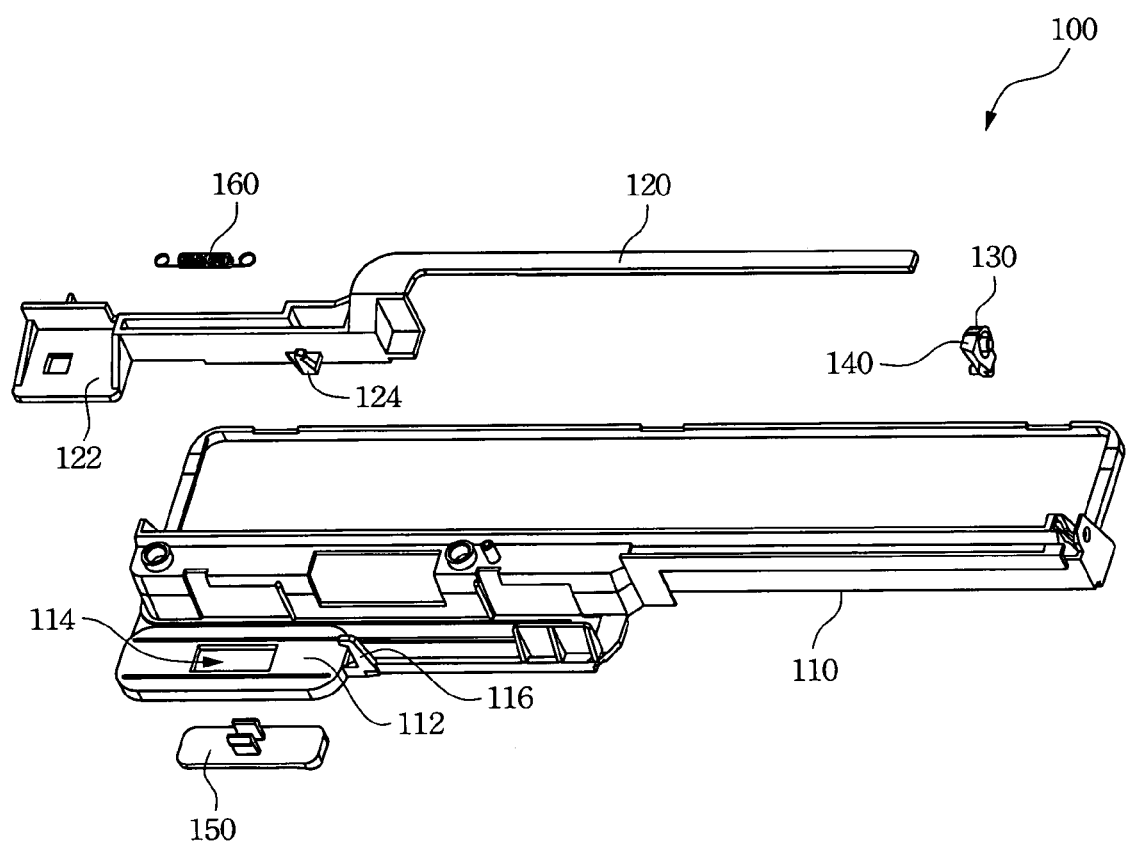
FIG. 1 is an explosion diagram of an embodiment of the rotary lock mechanism of the invention.

Reference will now be made in detail to the present preferred embodiments of the invention, examples of which are illustrated in the accompanying drawings. Wherever possible, the same reference numbers are used in the drawings and the description to refer to the same or like parts.

Refer to FIG. 1. FIG. 1 illustrates an explosion diagram of an embodiment of the rotary lock mechanism of the invention. The rotary lock mechanism 100 includes a housing 110, a linear latch 120, and a rotary latch 130. The linear latch 120 is disposed next to the housing 110, and the linear latch 120 may slide corresponding to the housing 110. The rotary latch 130 is pivoted on an end of the housing 110. The rotary latch 130 may be arranged vertically to the linear latch 120. A side of the rotary latch 130 facing the linear latch 120 may have a dual-angle ramp 140. The linear latch 120 may touch the dual-angle ramp 140 of the rotary latch 130 to push the rotary latch 130 to rotate corresponding to the linear latch 120 when the linear latch 120 slides corresponding to the housing 110.

The housing 110 includes a first extending portion 112, and the linear latch 120 includes a second extending portion 122. The first extending portion 112 may overlap the second extending portion 122. The rotary lock mechanism 100 may include a knob 150. The first extending portion 112 may have an opening 114. The knob 150 may passes through the opening 114 and couple to the second extending portion 122. The knob 150 may push and slide the linear latch 120 linearly. The linear latch 120 may touch the dual-angle ramp 140 of the rotary latch 130 to rotate the rotary latch 130, but the rotary latch 130 may not be over rotary by the limit of the dual-angle ramp 140.

The housing 110 includes a first hook 116. The first hook 116 protrudes from the first extending portion 112. The linear latch 120 includes a second hook 124. The second hook 124 protrudes from the second extending portion 122. An axis of the first hook 116 and the second hook 124 is parallel to the sliding direction of the linear latch 120. The rotary lock mechanism 100 includes a spring 160. Two ends of the spring 160 are disposed on the first hook 116 and the second hook 124 respectively. The spring 160 provides an elastic force to restore the linear latch 120 when the linear latch 120 is slid.

Figure 2A:
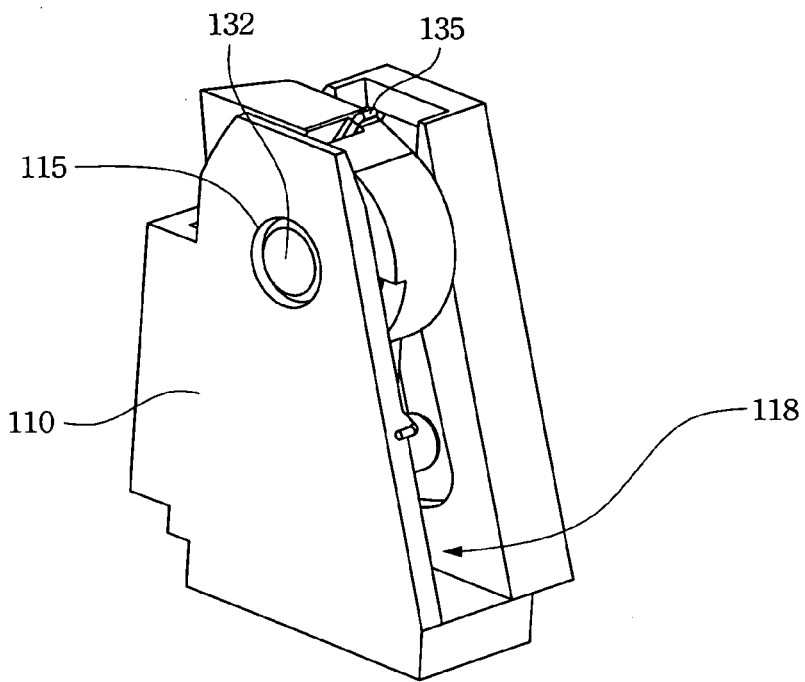
FIG. 2A and FIG. 2B are a front view diagram and a back view diagram of an embodiment of a rotary latch assembled in a housing of the invention.
Figure 2B:
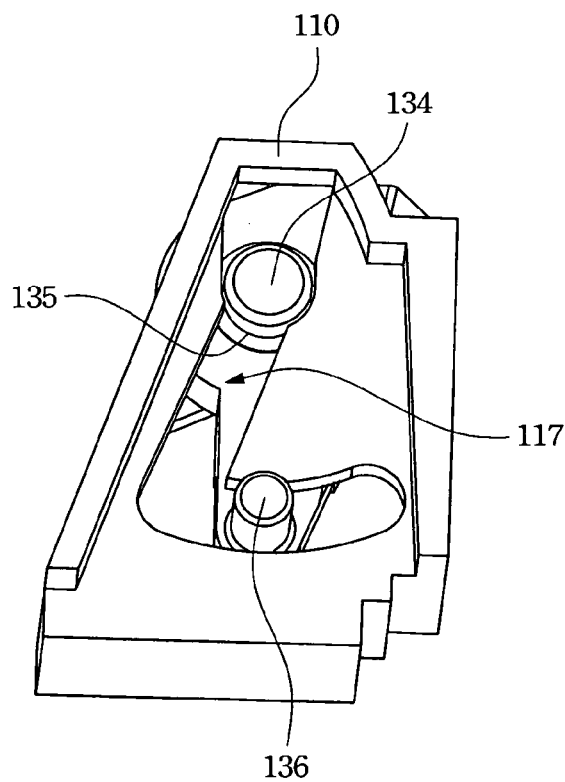

Refer to FIG. 2A and FIG. 2B. FIG. 2A and FIG. 2B are a front view diagram and a back view diagram of an embodiment of the rotary latch 130 assembled in the housing 110 of the invention. The end of the housing 110 has a cavity 118, and the rotary latch 130 is assembled in the cavity 118 of the housing 110. The rotary latch 130 has a fixing shaft 132. A side of the housing 110 has a through hole 115, and the fixing shaft 132 may couple to the through hole 115.

The rotary latch 130 may further include a pivoting shaft 134 and a protrusion 136. The pivoting shaft 134 and the protrusion 136 of the rotary latch 130 may be disposed on a side opposite to the fixing shaft 132. The rotary lock mechanism 100 may include a torsion spring 135 assembled on the pivoting shaft 134 to provide an elastic force to restore the rotary latch 130. An end of the torsion spring 135 may be fixed on the rotary latch 130 and opposite to the protrusion 136. The housing 110 may include a slot 117 disposed opposite the through hole 115, and the protrusion 136 of the rotary latch 130 may slide in the slot 117 with the movement of the rotary latch 130.

Figure 3A:
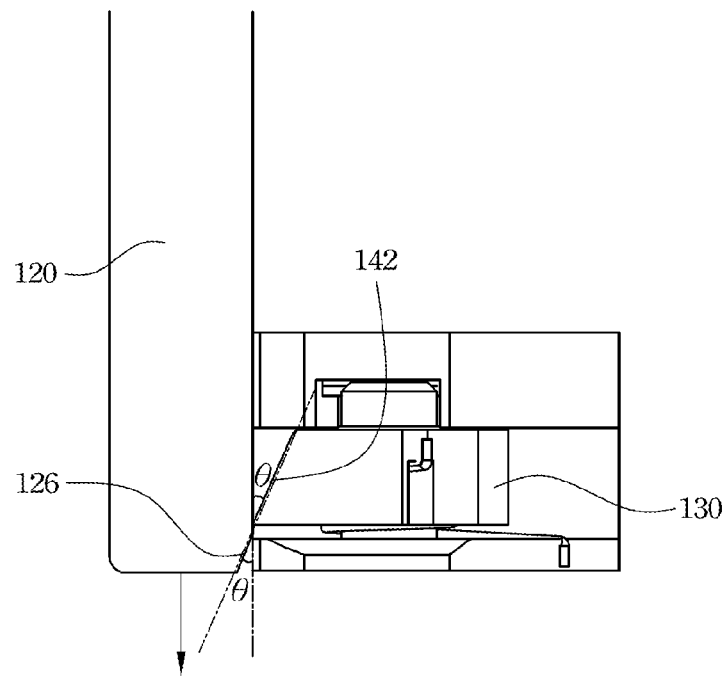
FIG. 3A is a top view diagram of the embodiment of the operation state of the rotary lock mechanism of the invention.

Refer to FIG. 3A. FIG. 3A illustrates a top view diagram of the embodiment of the operation state of the rotary lock mechanism 100 of the invention. The linear latch 120 may have a raked tip 126, which touches the rotary latch 130. The dual-angle ramp of the rotary latch 130 includes a first ramp 142, which is parallel to the raked tip 126. The raked tip 126 of the linear latch 120 may touch and push the first ramp 142 of the rotary latch 130 when the linear latch 120 is slid. The linear latch 120 may pass through the rotary latch 130 smoothly by the guiding of the first ramp 142. The angle θ of the raked tip 126 and the first ramp 142 is smaller than 30 degrees.

Figure 3B:
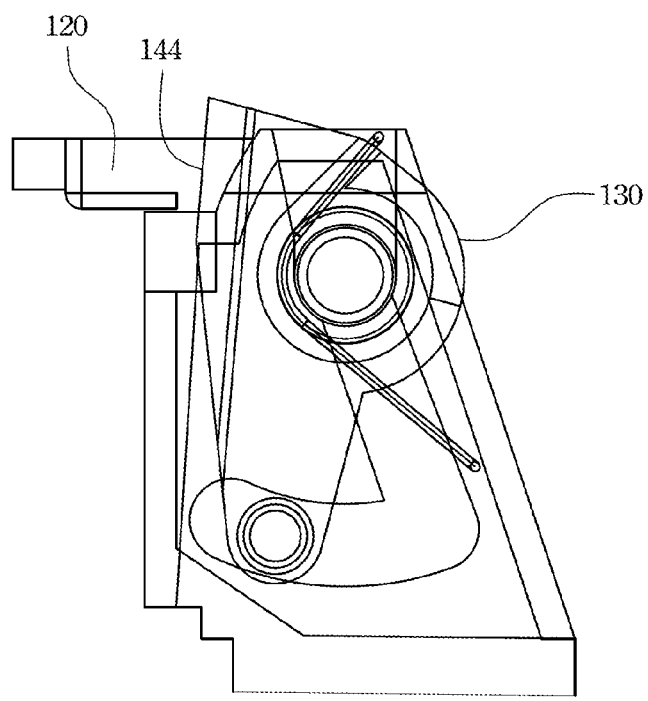
FIG. 3B is a side view diagram of the embodiment of the operation state of the rotary lock mechanism of the invention.

Refer to FIG. 3B. FIG. 3B illustrates a side view diagram of the embodiment of the operation state of the rotary lock mechanism 100 of the invention. The dual-angel ramp of the rotary latch 130 includes a second ramp 144. The second ramp 144 faces and touches the linear latch 120. The second ramp 144 may force the rotary latch 130 to rotate corresponding to the linear latch 120 when the linear latch 120 pushes the rotary latch 130. The rotary lock mechanism 100 may transform the linear movement of the linear latch 120 into the rotary movement of the rotary latch 130 by the second ramp 144 of the dual-angle ramp.

Figure 4:
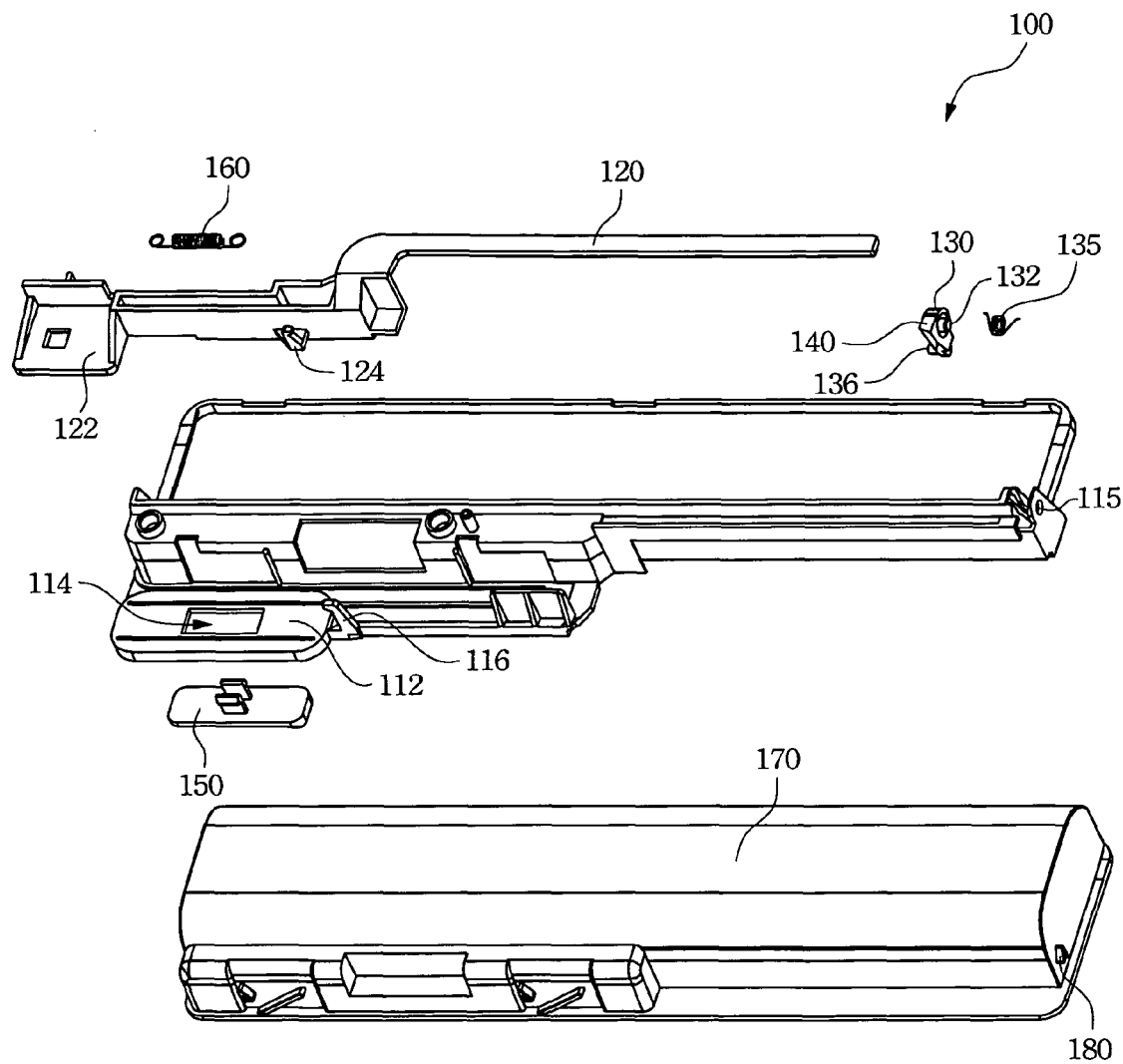
FIG. 4 is an explosion diagram of another embodiment of the rotary lock mechanism of the invention.

Refer to FIG. 4. FIG. 4 illustrates another embodiment of the rotary lock mechanism of the invention. The rotary lock mechanism 100 may be utilized to lock a battery 170 in a notebook. The rotary lock mechanism 100 may further include a position structure 180. The position structure 180 may be disposed on a surface of the battery 170, which faces the housing 110 and is vertical to the linear latch 120. The fixing shaft 132 of the rotary latch 130 is disposed opposite to the position structure 180, and the pivoting shaft 134 and the protrusion 136 of the rotary latch 130 are disposed facing the position structure 180.

Figure 5:
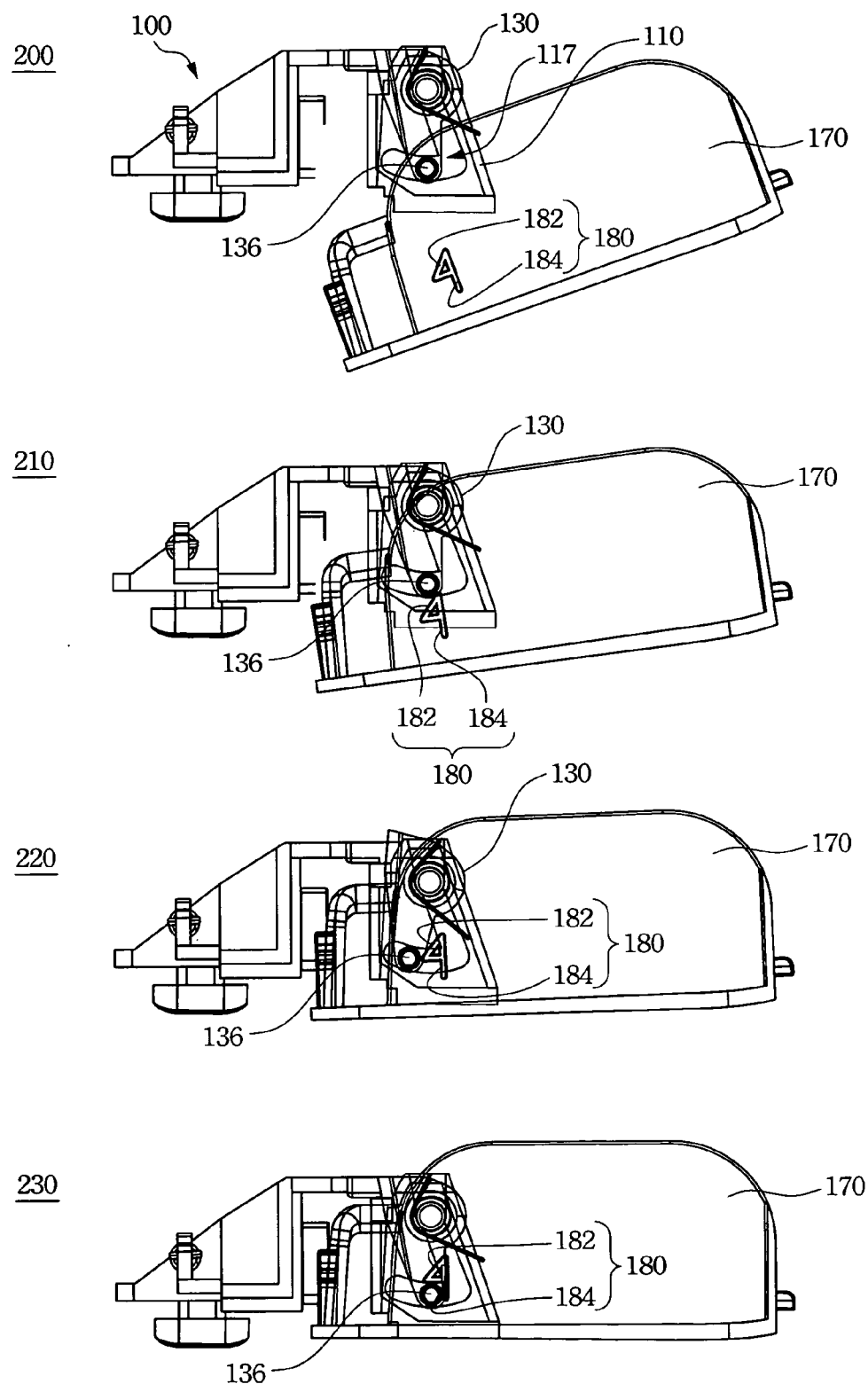
FIG. 5 is a schematic diagram of different assembling states of the embodiment of the rotary lock mechanism of the invention.

Refer to FIG. 5. FIG. 5 illustrates a schematic diagram of different assembling states of the embodiment of the rotary lock mechanism 100 of the invention. The rotary lock mechanism 100 is disposed in the notebook (not shown), and the battery 170 is disposed in the rotary lock mechanism 100. The position structure 180 includes an incline 182 and an L stopper 184 connecting with the incline 182. In state 200, the battery 170 is placed into the housing 110 slantwise. The protrusion 136 of the rotary latch 130 is disposed in the slot 117 of the housing 110. Then, in state 210, the protrusion 136 of the rotary latch 130 may touch the incline 182 of the position structure 180, and the protrusion 136 may be pushed by the incline 182 and slid into the slot 117. In state 220, the rotary latch 130 may be rotated when the protrusion 136 is slid in the slot 117. Finally, the protrusion 136 may cross through the incline 182 and fall into the L stopper 184. The protrusion 136 may couple to the L stopper 184 to fix the battery 170 in state 230.

Figure 6A:
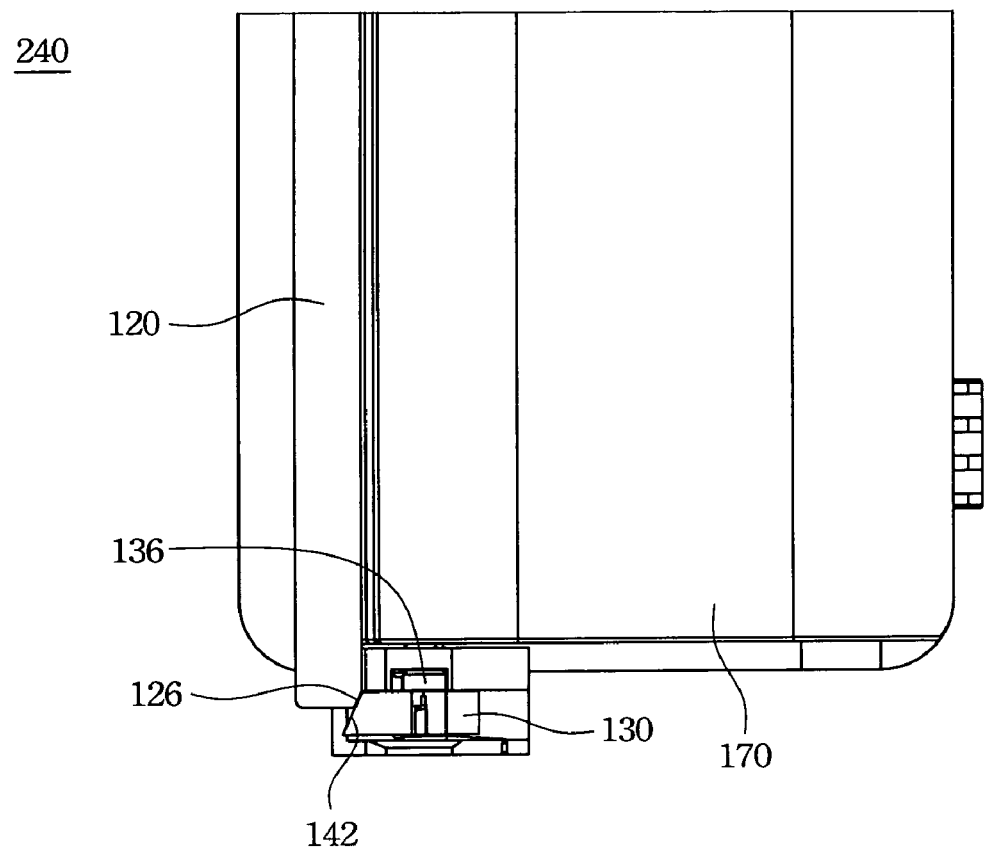
FIG. 6A and FIG. 6B are schematic diagrams of different release states of the rotary lock mechanism of the invention.
Figure 6A:
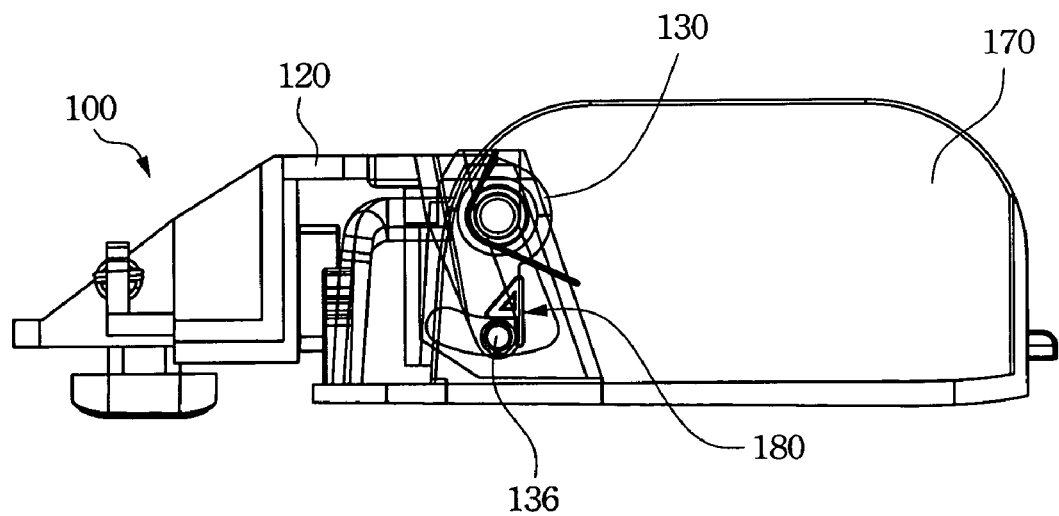
Figure 6B:
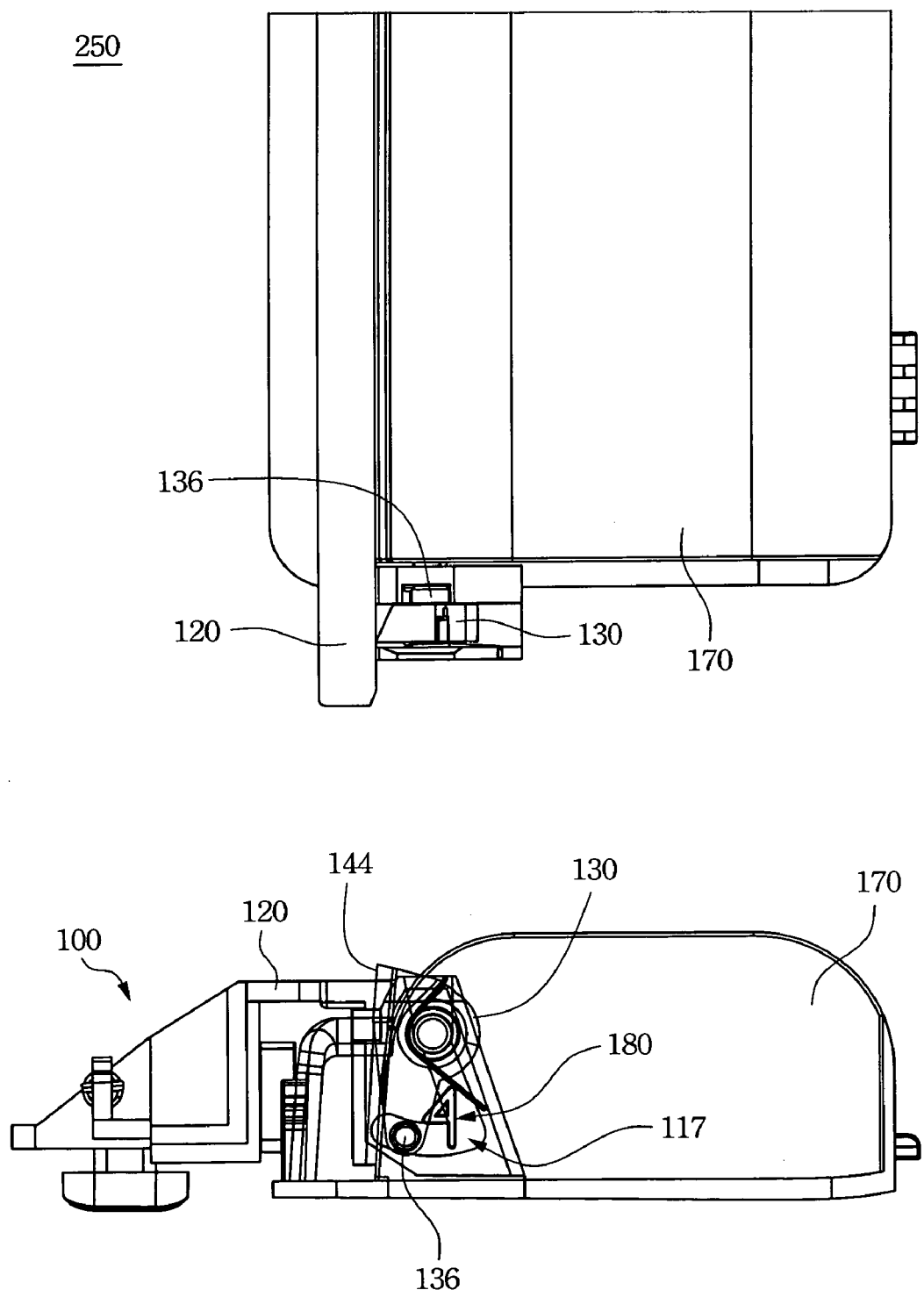

Refer to FIG. 6A and FIG. 6B. FIG. 6A and FIG. 6B are schematic diagrams of different release states of the rotary lock mechanism of the invention. In state 240, the linear latch 120 is pushed and slid toward the rotary latch 130. The linear latch 120 may pass through the rotary latch 130 smoothly by the raked tip 126 of the linear latch 120 and the first ramp 142 of the rotary latch 130. The protrusion 136 of the rotary latch 130 is still coupled with the position structure 180 of the battery 170 before the linear latch 120 pushes the rotary latch 130 completely.

In state 250, the front end of the linear latch 120 is slid over the rotary latch 130, and the linear latch 120 touches the second ramp 144 of the rotary latch 130. The second ramp 144 touching the linear latch 120 may guide and force the rotary latch 130 to rotate corresponding to the linear latch 120 but not over rotary. Then the protrusion 136 that has been slid into the slot 117 with the rotary of the rotary latch 130, and the protrusion 136 may depart from the position structure 180 to release the battery 170 from the rotary lock mechanism 100.

The rotary lock mechanism transforms the linear movement of the linear latch into the rotational movement of the rotary latch. The linear latch may pass through the rotary latch smoothly by the first ramp of the rotary latch and the raked tip of the linear latch. The rotary latch may rotate corresponding to the linear latch when the linear latch touches the second ramp of the rotary latch. The protrusion of the rotary latch may slide in the slot to couple to or release from the position structure of the battery.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A rotary lock mechanism for locking a battery in a notebook, the rotary lock mechanism comprising:
   a housing;
   a linear latch disposed next to the housing and sliding correspondingly to the housing;
   a position structure comprising an incline and a stopper and disposed on a surface of the battery that faces the housing; and
   a rotary latch pivoted at a side of the housing, which faces the position structure, the rotary latch comprising:
      a dual-angle ramp disposed facing the linear latch; and
      a protrusion disposed facing the position structure, wherein the linear latch touches the dual-angle ramp to rotate the rotary latch and releases the protrusion from the position structure when the linear latch slides correspondingly to the housing.

2. The rotary lock mechanism of claim 1, wherein the housing comprises a first extending portion; the linear latch comprises a second extending portion, and the first extending portion overlaps the second extending portion.

3. The rotary lock mechanism of claim 2, further comprising a knob disposed exposing the notebook, wherein the first extending portion has an opening, and the knob passes through the opening and couples to the second extending portion.

4. The rotary lock mechanism of claim 2, wherein the housing comprises a first hook protruding from the first extending portion; the linear latch comprises a second hook protruding from the second extending portion; and an axis of the first hook and the second hook is parallel to a sliding direction of the linear latch.

5. The rotary lock mechanism of claim 4, further comprising a spring, wherein two ends of the spring are disposed on the first hook and the second hook, respectively.

6. The rotary lock mechanism of claim 1, wherein the linear latch comprises a raked tip, which touches the rotary latch; and the dual-angle ramp of the rotary latch has a first ramp, which is parallel to the raked tip, wherein the raked tip touches the first ramp when the linear latch pushes the rotary latch.

7. The rotary lock mechanism of claim 6, wherein an angle of the raked tip and the first ramp is smaller than 30 degrees.

8. The rotary lock mechanism of claim 1, wherein the housing comprises a cavity to place the rotary latch; the rotary latch comprises a fixing shaft; the housing comprising a through hole disposed opposite to the position structure to couple to the fixing shaft.

9. The rotary lock mechanism of claim 1, wherein the rotary latch comprises a pivoting shaft disposed facing the position structure, and the rotary lock mechanism comprises a torsion spring arranged on the pivoting shaft, and an end of the torsion spring is fixed on the rotary latch and is opposite to the protrusion.

10. The rotary lock mechanism of claim 9, further comprising a slot disposed on the housing, wherein the protrusion of the rotary latch is slid in the slot of the housing.

11. The rotary lock mechanism of claim 1, wherein the dual-angle ramp of the rotary latch comprises a second ramp disposed facing the linear latch for forcing the rotary latch to rotate correspondingly to the linear latch when the linear latch pushes the rotary latch.

12. A rotary lock mechanism comprising:
   a housing;
   a linear latch disposed near the housing and sliding correspondingly to the housing, the linear latch comprising a raked tip that touches the rotary latch;
   a rotary latch pivoted at a side of the housing, the rotary latch comprising a dual-angle ramp disposed facing the linear latch, the dual-angle ramp of the rotary latch having a first ramp, which is parallel to the raked tip, wherein an angle of the raked tip and the first ramp is smaller than 30 degrees, and the raked tip touches the first ramp to rotate the rotary latch when the linear latch slides correspondingly to the housing.

13. The rotary lock mechanism of claim 12, wherein the housing comprises a first extending portion; the linear latch comprises a second extending portion, and the first extending portion overlaps the second extending portion.

14. The rotary lock mechanism of claim 13, wherein the first extending portion has an opening; the rotary lock mechanism comprises a knob, and the knob passes through the opening and couples to the second extending portion.

15. The rotary lock mechanism of claim 13, wherein the housing comprises a first hook protruding from the first extending portion; the linear latch comprises a second hook protruding from the second extending portion; and an axis of the first hook and the second hook is parallel to a sliding direction of the linear latch.

16. The rotary lock mechanism of claim 15, further comprising a spring, wherein two ends of the spring are disposed on the first hook and the second hook respectively.

17. The rotary lock mechanism of claim 12, wherein the dual-angle ramp of the rotary latch comprises a second ramp disposed facing the linear latch for forcing the rotary latch to rotate correspondingly to the linear latch when the linear latch pushes the rotary latch.

* * * * *